(12) United States Patent  (10) Patent No.: US 8,966,133 B2
Hart et al.  (45) Date of Patent: Feb. 24, 2015

(54) DETERMINING A MAPPING MODE FOR A DMA DATA TRANSFER

(71) Applicant: International Business Machines Corporation, Armonk, NY (US)

(72) Inventors: Brian W. Hart, Austin, TX (US); Liang Jiang, Austin, TX (US); Anil Kalavakolanu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/153,450

(22) Filed: Jan. 13, 2014

(65) Prior Publication Data

US 2014/0143457 A1    May 22, 2014

Related U.S. Application Data

(63) Continuation of application No. 13/678,970, filed on Nov. 16, 2012.

(51) Int. Cl.
G06F 13/28    (2006.01)

(52) U.S. Cl.
CPC ..................................... *G06F 13/28* (2013.01)
USPC ........................................... 710/26; 714/47.2

(58) Field of Classification Search
CPC .................................................... G06F 3/1285
See application file for complete search history.

(56) References Cited

U.S. PATENT DOCUMENTS

| 4,947,366 | A  | 8/1990  | Johnson       |
| 5,659,696 | A  | 8/1997  | Amini et al.  |
| 5,826,107 | A  | 10/1998 | Cline et al.  |
| 6,145,030 | A  | 11/2000 | Martwick      |
| 6,598,097 | B1 * | 7/2003 | Daniels et al. ................... 710/22 |
| 6,684,274 | B1 | 1/2004  | Chong, Jr.    |
| 6,725,289 | B1 | 4/2004  | Waldspurger et al. |
| 6,804,729 | B2 | 10/2004 | Swanberg      |
| 7,415,550 | B2 | 8/2008  | Tanaka et al. |
| 7,533,198 | B2 | 5/2009  | Bartley et al. |
| 7,676,646 | B2 | 3/2010  | Cohen         |
| 7,685,330 | B2 | 3/2010  | Banerjee et al. |
| 7,783,793 | B2 | 8/2010  | Bartley et al. |

(Continued)

FOREIGN PATENT DOCUMENTS

| EP | 0784277 A1    | 7/1997 |
| EP | 1787205 B1    | 3/2009 |
| WO | 2007088426 A1 | 8/2007 |

OTHER PUBLICATIONS

Hart et al., "Determining a Mapping Mode for a DMA Data Transfer", U.S. Appl. No. 13/678,970, filed Nov. 16, 2012.

(Continued)

*Primary Examiner* — Elias Mamo (74) *Attorney, Agent, or Firm* — Richard A. Wilhelm; James R. Nock (57) ABSTRACT

According to embodiments of the invention, methods, computer readable storage medium, and a computer system for determining a mapping mode for a DMA data transfer are disclosed. The method may include receiving a request for a DMA data transfer within a computer system. The method may also include determining a mapping mode for the DMA data transfer based on available system profile data in response to receiving the request. The method may also include mapping the memory using the determined mapping mode.

15 Claims, 5 Drawing Sheets

(56) References Cited

U.S. PATENT DOCUMENTS

| | | |
|---|---|---|
| 7,870,307 B2 | 1/2011 | Suba et al. |
| 7,877,524 B1 | 1/2011 | Annem et al. |
| 7,917,597 B1 | 3/2011 | Lentini |
| 8,001,430 B2 | 8/2011 | Shasha et al. |
| 8,250,281 B2 | 8/2012 | Bauman et al. |
| 2004/0064601 A1 | 4/2004 | Swanberg |
| 2005/0223136 A1* | 10/2005 | Tanaka et al. ............ 710/22 |
| 2008/0307122 A1 | 12/2008 | Butler et al. |
| 2008/0313357 A1* | 12/2008 | Wang et al. ............ 710/14 |
| 2009/0287857 A1 | 11/2009 | Vu |
| 2010/0169673 A1* | 7/2010 | Saripalli ............ 713/300 |
| 2010/0180158 A1* | 7/2010 | Corry et al. ............ 714/38 |
| 2010/0251268 A1 | 9/2010 | Cardona et al. |
| 2013/0103857 A1 | 4/2013 | Fukada |

OTHER PUBLICATIONS

Cardona et al., "Determining a Direct Memory Access Data Transfer Mode", U.S. Appl. No. 14/081,432, filed Nov. 15, 2013.

Cardona et al., "Determining a Direct Memory Access Data Transfer Mode", filed Jan. 13, 2014.

* cited by examiner

| | PROFILE DATA | | | | |
|---|---|---|---|---|---|
| 312 — DATA COPY HARDWARE | PRESENT | PRESENT | PRESENT | PRESENT | ABSENT |
| 314 — BULK MAPPING SUPPORT | PRESENT | PRESENT | PRESENT | ABSENT | PRESENT |
| 316 — # OF SYSTEM ADAPTERS | 6 | 6 | 6 | 4 | 4 |
| 318 — # OF ADAPTERS BUSY | 4 | 6 | 4 | 4 | 4 |
| 320 — POWER MODE | NORMAL | NORMAL | NORMAL | LOW | LOW |
| 322 — # MAPPERS RUNNING | 100-199 | 100-199 | 0-99 | 0-99 | 0-99 |
| 324 — ADAPTER CONNECTION TOPOLOGY | PCIe | PCIe | PCIe | PCIe | GX |
| 326 — HARDWARE LEVEL | 23 | 23 | 23 | 23 | 23 |
| 328 — FIRMWARE LEVEL | 1.1e | 1.1e | 1.1e | 1.1e | 1.1e |
| 330 — MAPPING MODE | COPY | COPY | COPY | MAP | MAP |
| | ↑302 | ↑304 | ↑306 | ↑308 | ↑310 |

DETERMINING A MAPPING MODE FOR A DMA DATA TRANSFER

CROSS-REFERENCE TO RELATED APPLICATIONS

This application is a continuation of co-pending U.S. patent application Ser. No. 13/678,970, filed Nov. 16, 2012. The aforementioned related patent application is herein incorporated by reference in its entirety.

TECHNICAL FIELD

The field of the invention relates to computer systems, and more specifically, to the processing of DMA data transfers within a computer system.

BACKGROUND

Computer systems typically include a combination of computer programs and hardware, such as semiconductors, transistors, chips, circuit boards, storage devices, and processors. The computer programs are stored in the storage devices and are executed by the processors. A common feature of many computer systems is the transfer of data between hardware components. This transfer may be performed by a central processing unit (CPU) or it may be performed by a process known as direct memory access (DMA) in which a hardware unit accesses memory independently of the CPU.

SUMMARY

According to embodiments of the invention, methods, computer readable storage medium, and a computer system for determining a mapping mode for a DMA data transfer are disclosed. The method may include receiving a request for a DMA data transfer within a computer system. The method may also include determining a mapping mode for the DMA data transfer based on available system profile data in response to receiving the request. The method may also include mapping the memory using the determined mapping mode.

BRIEF DESCRIPTION OF THE SEVERAL VIEWS OF THE DRAWINGS

In the drawings and the Detailed Description, like numbers generally refer to like components, parts, steps, and processes.

DETAILED DESCRIPTION

A typical task of modern computer systems is the transfer of data between various pieces of computer hardware, such as disk drives, graphics cards, network cards, and random access memory (RAM) modules. This data transfer may be referred to as input/output (I/O) operation. Direct memory access (DMA) provides an I/O channel with system memory access independent of the central processing unit (CPU). With DMA, the CPU can initiate the I/O operation and allow the DMA to perform the data transfer while the CPU performs other tasks within the computer system. This allows the computer system as a whole to operate more efficiently.

Before DMA may perform an I/O operation, a memory mapping is needed to translate an I/O adapter bus address to a physical memory address. Two modes may be used to perform this mapping. The first mode, known as data copy, utilizes one or more "persistent" DMA memory map regions that have been designated to be used for DMA transfers. DMA data transfers using the data copy mode will always use this persistent DMA memory map region to transfer data from the I/O adapter to the system memory. The CPU may then transfer the data from the persistent DMA memory map region to another region within the same system memory, such as an area being utilized by a particular program. The use of the persistent DMA memory map region avoids the need for a mapping setup for each I/O transfer. However, this mode does use some CPU resources for copying the data within the system memory. The second mode, known as map/unmap, establishes a mapping for each I/O operation prior to data transfer. Any area within the system memory may be utilized for the mapping. This creates a temporary DMA memory map region. Once the data transfer is complete the mapped memory area is unmapped and returned to the general use of the system. This mode spends mapping time for each DMA, but saves CPU resources by not requiring the operation of copying the data within the system memory.

Typically, device drivers in current operating systems are designed to use either the data copy mode or the map/unmap mode. The mode is pre-determined and can not be changed during run-time. However, because of the dynamic nature of computer systems in both their software and hardware configurations, the pre-determined mode may not be the best mode for the current system profile and, therefore, the I/O operation performance may be suboptimal. Embodiments of the invention provide an automated process by which a mapping mode may be determined. This determination may include comparing available system profile data at the time a mapping request was received to a database of stored system profiles. The database may also include a mapping mode associated with each stored system profile. If the current system profile matches one of the stored system profiles, then the mapping mode of that stored system profile may be used to perform the currently requested mapping. The mapping mode associated with each stored system profile may be determined by running two or more predetermined performance tests that compare the mapping modes for a particular system profile. The predetermined performance tests may be performed each time any parameter of the system profile has changed, or they may be performed if there is no matching stored system profile at the time a mapping request is received.

Figure 1:
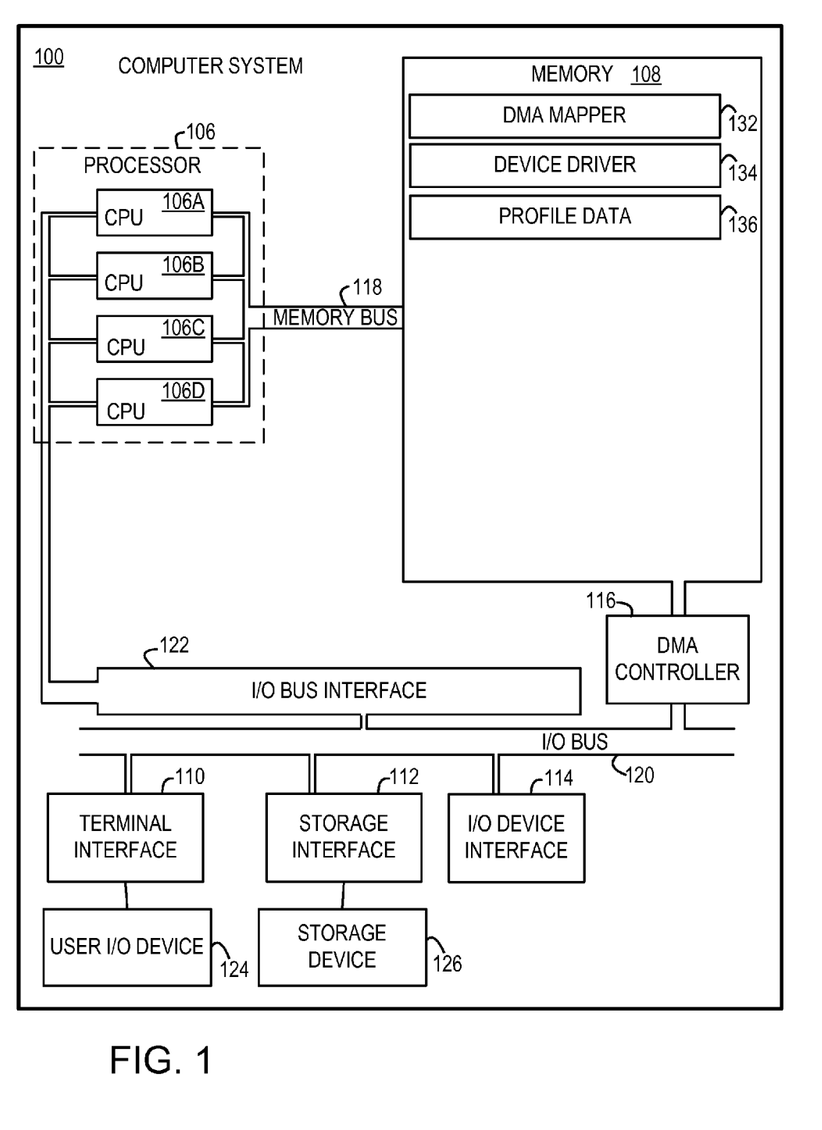
FIG. 1 depicts a block diagram of an exemplary computer system for implementing an embodiment of the invention.

Referring to the drawings, wherein like numbers denote like parts throughout the several views, FIG. 1 depicts a high-level block diagram representation of a computer system 100, according to an embodiment of the present invention. The terms "server" and "client" are used herein for convenience only, and in various embodiments a computer system that operates as a client computer in one environment may operate as a server computer in another environment, and vice versa. The mechanisms and apparatus of embodiments of the present invention apply equally to any appropriate computing system, including a computer system that does not employ the client-server model.

The major components of the computer system 100 may include one or more processors 106, a main memory 108, a terminal interface 110, a storage interface 112, an I/O (Input/Output) device interface 114, and a DMA controller 116, all of which may be communicatively coupled, directly or indirectly, for inter-component communication via a memory bus 118, an I/O bus 120, and an I/O bus interface unit 122.

The computer system 100 may contain one or more general-purpose programmable central processing units (CPUs) 106A, 106B, 106C, and 106D, herein generically referred to as the processor 106. In an embodiment, the computer system 100 may contain multiple processors typical of a relatively large system; however, in another embodiment the computer system 100 may alternatively be a single CPU system. Each processor 106 may execute instructions stored in the main memory 108 and may include one or more levels of on-board cache.

In an embodiment, the main memory 108 may include a random-access semiconductor memory, storage device, or storage medium (either volatile or non-volatile) for storing or encoding data and programs. In another embodiment, the main memory 108 may represent the entire virtual memory of the computer system 100, and may also include the virtual memory of other computer systems coupled to the computer system 100. The main memory 108 may be conceptually a single monolithic entity, but in other embodiments the main memory 108 may be a more complex arrangement, such as a hierarchy of caches and other memory devices.

The main memory 108 may store or encode a DMA mapper 132, a device driver 134, and profile data 136, hereafter collectively referred to as "memory elements." Although the memory elements are illustrated as being contained within the main memory 108 in the computer system 100, in other embodiments some or all of them may be on different computer systems and may be accessed remotely, e.g., via a network. The computer system 100 may use virtual addressing mechanisms that allow the programs of the computer system 100 to behave as if they only have access to a large, single storage entity instead of access to multiple, smaller storage entities. Thus, while the memory elements are illustrated as being contained within the main memory 108, these elements are not necessarily completely contained in the same storage device at the same time. Further, although the memory elements are illustrated as being separate entities, in other embodiments some of them, portions of some of them, or all of them may be packaged together.

In an embodiment, the memory elements may include instructions or statements that execute on the processor 106 or instructions or statements that may be interpreted by instructions or statements that execute on the processor 106, to carry out the functions as further described below with reference to FIGS. 2, 3, 4, 5, and 6. In another embodiment, the memory elements, or two or more of these elements may be implemented in hardware via semiconductor devices, chips, logical gates, circuits, circuit cards, other physical hardware devices, or a combination of these devices in lieu of, or in addition to, a processor-based system. In an embodiment, the memory elements, or two or more of these elements may include data in addition to instructions or statements.

The memory bus 118 may provide a data communication path for transferring data among the processor 106 and the main memory 108. The I/O bus interface 122 may provide a data communication path for transferring data among the processor 106 and the I/O bus 120. The I/O bus interface 122 may be further coupled to the I/O bus 120 for transferring data to and from the various I/O units. The I/O bus interface unit 122 communicates with multiple I/O interface units 110, 112, 114, and 116, which may also be known as I/O processors (IOPs) or I/O adapters (IOAs), through the I/O bus 120.

The I/O interface units support communication with a variety of storage and I/O devices. For example, the terminal interface unit 110 supports the attachment of one or more user I/O devices 124, which may include user output devices (such as a video display device, speaker, or television set) and user input devices (such as a keyboard, mouse, keypad, touchpad, trackball, buttons, light pen, or other pointing device). A user may manipulate the user input devices utilizing a user interface, in order to provide input data and commands to the user I/O device 124 and the computer system 100, and may receive output data via the user output devices. For example, a user interface may be presented via the user I/O device 124, such as displayed on a display device, played via a speaker, or printed via a printer.

The storage interface 112 supports the attachment of one or more disk drives or direct access storage devices 126 (which are typically rotating magnetic disk drive storage devices, although they could alternatively be other storage devices, including arrays of disk drives configured to appear as a single large storage device to a host computer). In another embodiment, the storage device 126 may be implemented via any type of secondary storage device. The contents of the main memory 108, or any portion thereof, may be stored to and retrieved from the storage device 126 as needed. The I/O device interface 114 may provide an interface to any of various other input/output devices or devices of other types, such as printers or fax machines. The DMA controller 116 may provide hardware subsystems within the computer system 100 to access the main memory 108 independently of the central processing unit (CPU).

Figure 2:
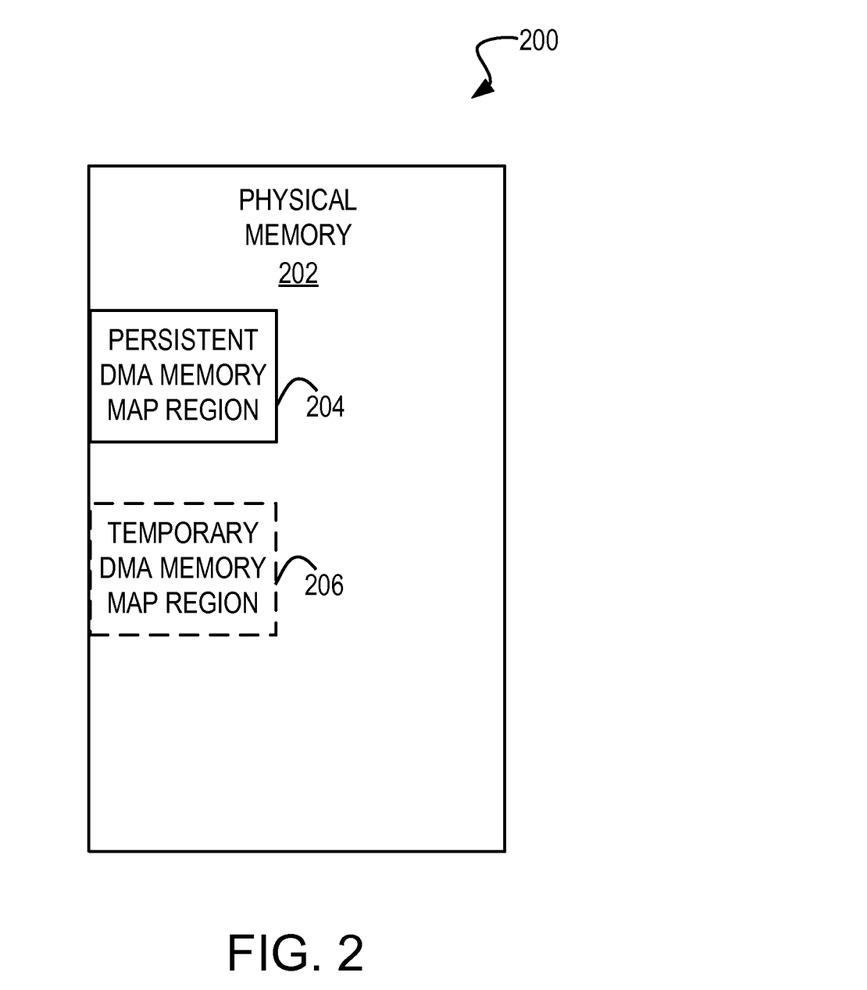
FIG. 2 depicts a block diagram of a memory structure, according to an embodiment of the invention.

FIG. 2 depicts a block diagram of a memory structure 200, according to an embodiment of the invention. The memory structure 200 may include a physical memory 202, such as volatile memory or random access memory (RAM). The physical memory 202 may contain one or more physical regions of system memory, such as a persistent DMA memory map region 204 and a temporary DMA memory map region 206. The persistent DMA memory map region 204 may be a pre-assigned region of the physical memory 202 which is designated for receiving data during DMA data transfers, and may only be used for that purpose. The persistent DMA memory map region 204 may be utilized for a data copy mode of memory mapping for a DMA data transfer. DMA data transfers using the data copy mode may always use this persistent DMA memory map region 204 to transfer data from the I/O adapter to the physical memory 202. The processor 106 may then transfer the data from the persistent DMA memory map region 204 to any other region of the physical memory 202, such as an area being utilized by a particular program. In one embodiment, two or more persistent DMA memory map regions 204 may be allocated at any point in time.

The temporary DMA memory map region 206 may be any region of the physical memory 202 that has been temporarily designated to receive data during a DMA data transfer. The temporary DMA memory map region 206 may be utilized for the map/unmap mode of memory mapping for a DMA data transfer. Any unused or unallocated area within the system memory may be used as a temporary DMA memory map region 206. A mapping of the temporary DMA memory map region 206 is established for each I/O operation prior to the DMA data transfer. Once the data transfer is complete the temporary DMA memory map region 206 may be unmapped and returned to a pool available for general system use.

Figure 3:
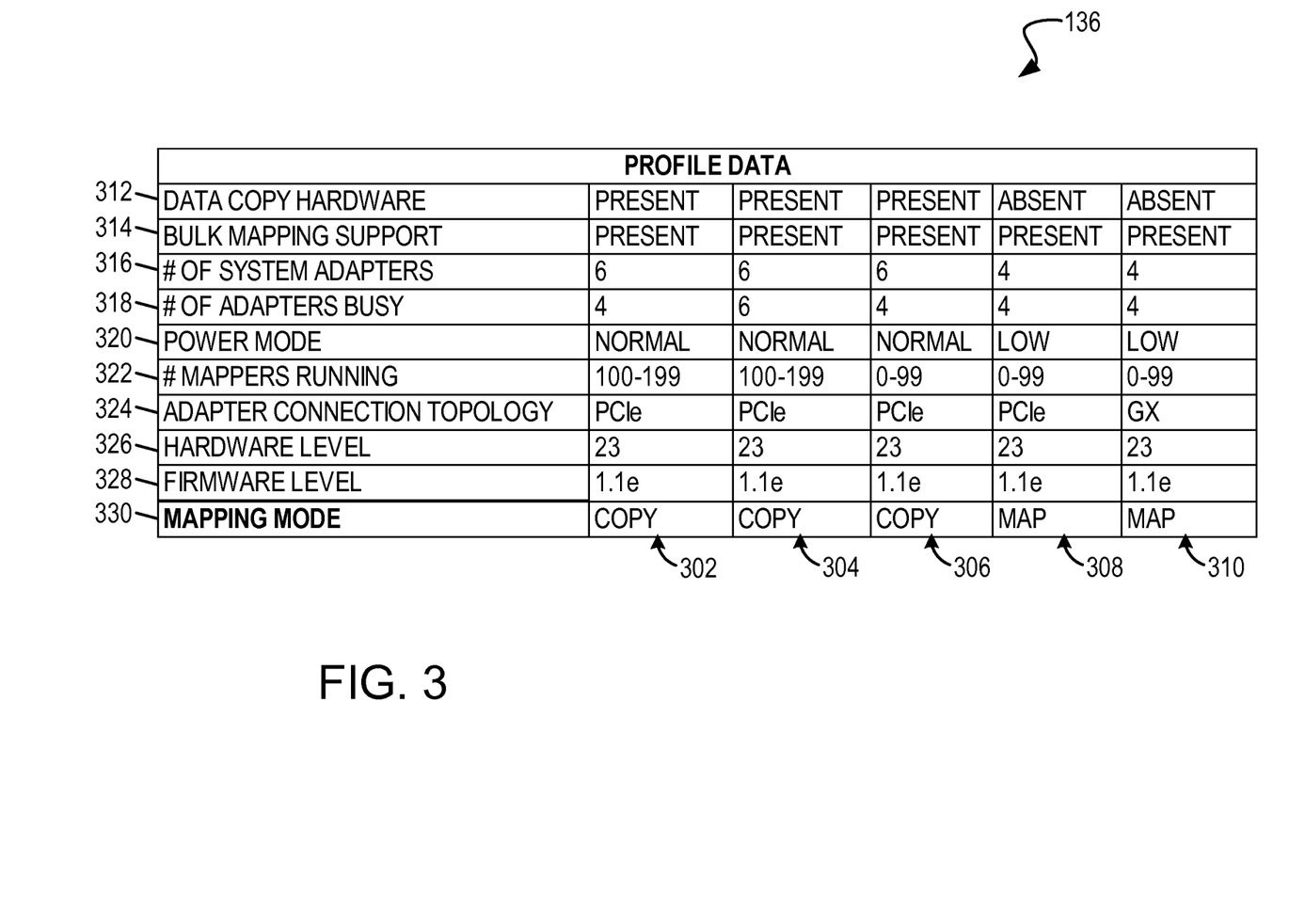
FIG. 3 depicts a diagram of an exemplary data structure for profile data, according to an embodiment of the invention.

FIG. 3 depicts a diagram of an example data structure for profile data 136, according to an embodiment of the invention. Profile data 136 may include various system profiles and a preferred mapping mode associated with each system profile. The stored system profiles may be compared to a current system profile in order to determine a preferred mapping mode for the current system profile.

The profile data 136 table may be generated by the DMA mapper 132. In some embodiments a DMA mapper may be a component of the operating system of a computer. In other embodiments a DMA mapper may be a component of a hypervisor. The profile data 136 table may include example records 302, 304, 306, 308, and 310, shown as columns in the profile data 136 table. Each record may include a data copy hardware field 312, a bulk mapping support field 314, a number of system adapters field 316, a number of adapters busy field 318, a power level field 320, a number of mappers running field 322, an adapter connection topology field 324, a hardware level field 326, a firmware level field 328, and a mapping mode field 330. In some embodiments, other profile data parameters may be included. In other embodiments, fewer profile data parameter may be included. Each record may represent available system profile data and may include any information related to that system profile at a point in time. For example, record 302 may represent the available system profile data when the computer system 100 was initialized.

The data copy hardware field 312, in each record, may identify whether the computer system 100 contains data copy hardware. For example, if the computer system 100 contains a data copy hardware, such as a DMA device, then the data copy hardware field 312 may contain the value "PRESENT." The bulk mapping support field 314 may identify whether the computer system 100 contains bulk mapping support. For example, if the computer system 100 contains bulk mapping support, such as allowing multiple DMA mappings to be completed in a single operation, then the bulk mapping support filed 312 may contain the value "PRESENT." The number of system adapters field 316 may identify the number of system adapters present in the computer system 100. For example, the computer system 100 may have four I/O adapters presently installed.

The number of adapters busy field 318 may identify the number of adapters that are currently in use. For example, the computer system 100 may have four I/O adapter presently installed and two I/O adapters currently in use. The power level field 320 may identify the power mode at which the computer system 100 is running. For example, this field may include values such as "NORMAL," "LOW," or any similar power level value. The number of mappers running field 322 may identify the number of mappers currently running on the computer system 100. The adapter connection topology field 324 may identify the I/O adapter interconnect bus standard, such as "PCIe" or "GX." The hardware level field 326 may identify the current hardware revision level of the computer system 100. The firmware level field 328 may identify the current firmware revision level of the computer system 100. The mapping mode field 330 may identify the mapping mode previously determined to be the preferred mode of mapping for the computer system 100 profile associated with that record.

Figure 4:
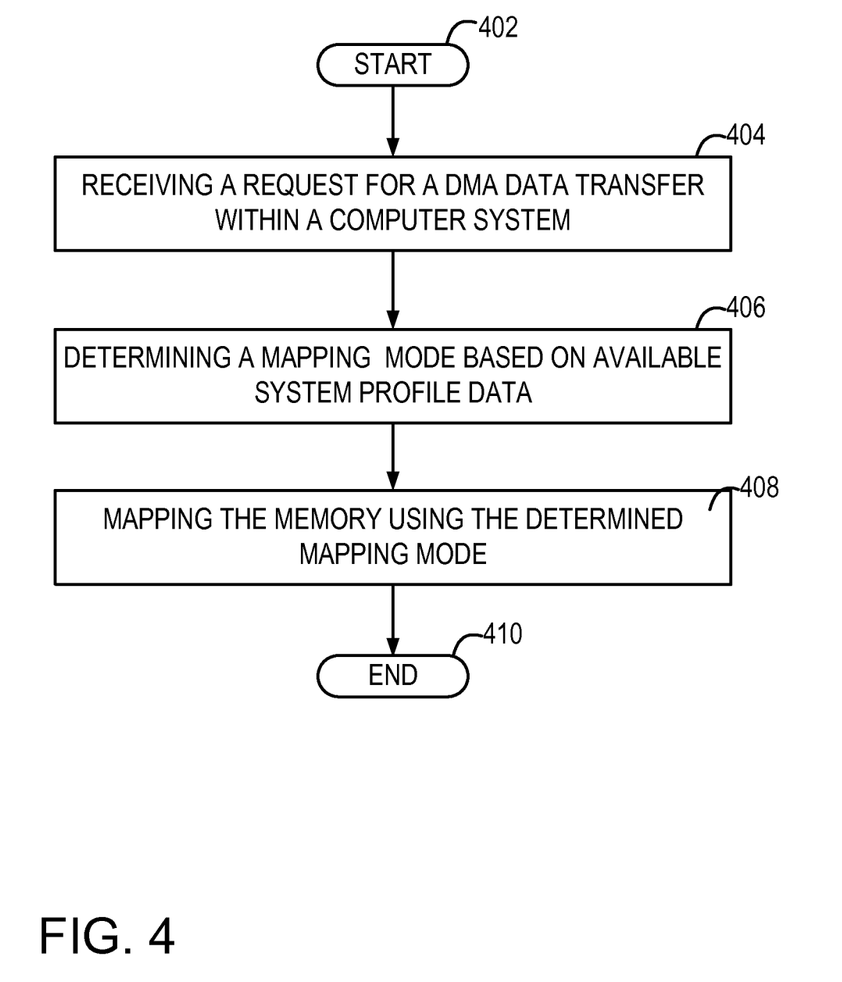
FIG. 4 depicts a flow chart of an exemplary process for determining a mapping mode for a DMA data transfer, according to an embodiment of the invention.

FIG. 4 depicts a flow chart of an example process for determining a mapping mode for a DMA data transfer, according to an embodiment of the invention. The process may begin at block 402. Block 404 may contain the operation of receiving a request for a DMA data transfer within a computer system. For example, the DMA mapper 132 of the computer system 100 may receive from the device driver 134 a request to transfer data to or from the I/O device interface 114 and the system memory 108 via the DMA controller 116. In order to complete this request a mapping is needed to translate an I/O adapter bus address to a physical memory address. This mapping may be performed by one of two modes, the data copy mode or the map/unmap mode. Block 406 may contain the operation of determining a mapping mode based on available system profile data. This determination may be in response to receiving the request for a DMA data transfer. For example, one or more performance tests may be performed following a request for a DMA transfer if there is no matching stored system profile at the time the mapping request is received. In this example, a one or more performance tests may be performed for one of the modes, e.g., map/unmap, for comparison with a known performance metric of a default mode, e.g., copy. The process of determining a mapping mode is explained in further detail below with reference to FIG. 5. In other embodiments, the mapping method may be determined by at least in part based on the amount of data to be transferred. For example, if the size of a requested DMA data transfer is less than a threshold size for a current system profile, then the data copy mode of mapping may be used instead of the map/unmap mode. Distinct thresholds may be provided for different system profiles. Block 408 may contain the operation of mapping the memory using the determined mapping mode. At block 410, the process may end.

Figure 5:
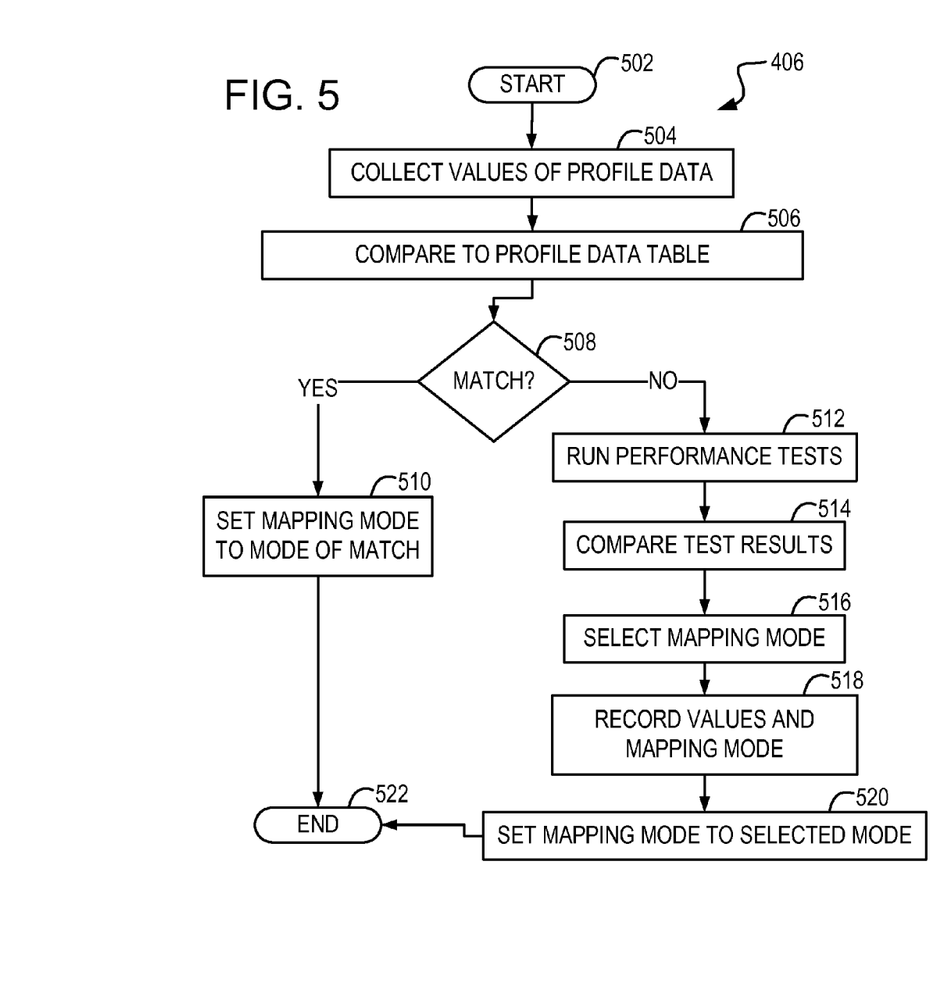
FIG. 5 depicts a flow chart of an exemplary process for determining a mapping mode based on available system profile data, according to an embodiment of the invention.

FIG. 5 depicts a flow chart of an example process for determining a mapping mode based on the available system profile data, according to an embodiment of the invention. The process may be contained within block 406 as depicted in FIG. 4. The process may begin at block 502. At block 504, values of the profile data 136 may be collected. These values may be collected by the DMA mapper 132 may include any profile data associated with the computer system 100, such as the profile data of FIG. 3 above. At block 504, the collected values may be compared to the values of the records of the profile data 136, such as example records 302, 304, 306, 308, and 310. At block 508, a deciding operation may determine if the collected values of the profile data 136 match the values of a record of the profile data 136. If the collected values do match a record, then the process may move to block 510. At block 510, the mapping mode is set to the matching record's mapping mode 330 and the process may move to block 522 where the process may end.

Returning to block 508, if the collected values do not match a record, then the process may move to block 512. At block 512, two or more performance tests may be run. The performance test may include performing a relatively small data transfer using both mapping modes. For example, one or more tests may include performing one or more transfers using the data copy mapping mode and collecting one or more associated performance statistics. Another test may include performing one or more transfers using the map/unmap mapping mode and collecting one or more associated performance statistics. At block 514, the results of the performance tests or the performance statistics may be compared. This comparison may include comparing the amount of time each mapping mode takes to complete the performance test. At block 516 the mapping mode which best meets the criteria of the comparison is selected. For example, if the desired criteria for selecting a mapping mode includes selecting the mapping mode which completes the performance test the fastest, then the comparison may show which mapping mode completes the performance test the fastest and that mapping mode may be selected. In another embodiment the selected mapping mode may be the mode which uses the fewest CPU resources. At block 518, the selected mapping mode and the values of the profile data may be recorded. For example, they may be recorded as a record in the profile performance data 136. At block 520, the mapping mode is set to the selected mapping mode and the process may move to block 522 where the process may end.

Figure 6:
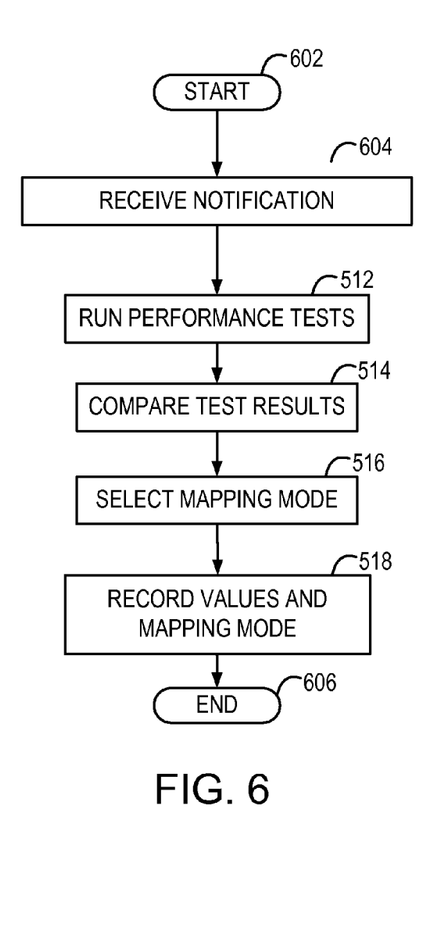
FIG. 6 depicts a flow chart of an exemplary process for determining profile data, according to an embodiment of the invention.

FIG. 6 depicts a flow chart of an example process for determining profile data, according to an embodiment of the invention. The process may begin at block 602. At block 604, a notification may be received. A notification may include: a notification that a system profile data value has changed, a notification that a predetermined time interval has elapsed, or any similar system profile notification. For example, the DMA mapper 132 may receive a notification that the hardware revision level 326 of the system has changed. The process may then proceed to blocks 512, 514, 516, and 518, which may contain the operations of the correspondingly numbered blocks of FIG. 5. The process may end at block 606.

Referring back to FIG. 1, in various embodiments, the computer system 100 may be a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other appropriate type of electronic device.

The computer system 100 may include some or all of the hardware and/or computer program elements of the computer system 100. The various program components implementing various embodiments of the invention may be implemented in a number of manners, including using various computer applications, routines, components, programs, objects, modules, data structures, etc., and are referred to herein as "computer programs," or simply "programs."

The computer programs include one or more instructions or statements that are resident at various times in various memory and storage devices in the computer system 100 and that, when read and executed by one or more processors in the computer system 100, or when interpreted by instructions that are executed by one or more processors, cause the computer system 100 to perform the actions necessary to execute steps or elements including the various aspects of embodiments of the invention. Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device), or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. For example, a computer-readable storage medium may be, but not limited to, an electronic, magnetic, optical, electromagnetic, infrared, or semiconductor system, apparatus, or device, or any suitable combination of the foregoing. More specific examples (a non-exhaustive list) of the computer-readable storage media may include: an electrical connection having one or more wires, a portable computer diskette, a hard disk, a random access memory (RAM), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may include a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency, or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks.

The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which includes one or more executable instructions for implementing the specified logical function(s). In some embodiments, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the invention may also be delivered as part of a service engagement with a client corporation, nonprofit organization, government entity, or internal organizational structure. Aspects of these embodiments may include configuring a computer system to perform, and deploying computing services (e.g., computer-readable code, hardware, and web services) that implement, some or all of the methods described herein. Aspects of these embodiments may also include analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described herein may be identified based upon the application for which they are implemented in a specific embodiment of the invention. But, any particular program nomenclature used herein is used merely for convenience, and thus embodiments of the invention are not limited to use solely in any specific application identified and/or implied by such nomenclature. The exemplary environments illustrated in FIG. 1 are not intended to limit the present invention. Indeed, other alternative hardware and/or program environments may be used without departing from the scope of embodiments of the invention.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

What is claimed is:

1. A computer system, comprising:
a processor;
a memory communicatively coupled with the processor; and
a direct memory access (DMA) controller to:
receive a request for a DMA data transfer within the computer system;
determine, in response to the receiving of the request for the DMA data transfer, a mapping mode based on available system profile data, wherein the DMA controller is configured to:
perform two or more mapping performance tests, wherein:
a first mapping performance test includes performing one or more transfers using a data copy mapping mode and collecting one or more associated performance statistics, and
a second mapping performance test includes performing one or more transfers using a map/unmap mapping mode and collecting one or more associated performance statistics,
determine the mapping mode based on a comparison of a result of the mapping performance tests, and
record the mapping mode with the system profile data; and
map one memory using the determined mapping mode.

2. The computer system of claim 1, wherein the available system profile data includes at least one of available hardware components, processor availability, I/O adapter availability, computer system power mode, I/O adapter interconnect bus standard, hardware revision level, firmware revision level, and DMA mapping history.

3. The computer system of claim 1, wherein the DMA controller determines the mapping mode based at least in part on the size of the DMA data transfer.

4. The computer system of claim 1, wherein the DMA controller determines the mapping mode by selecting a predetermined mapping mode based on historical system profile data.

5. The computer system of claim 1, wherein the DMA controller determines the mapping mode by selecting a predetermined mapping mode based on recorded system profile data.

6. The computer system of claim 1, wherein the one memory is a main memory directly coupled with a processor via a memory bus.

7. A computer system, comprising:
   a processor;
   a memory communicatively coupled with the processor; and
   a direct memory access (DMA) controller to:
      receive a notification of a modification of a computer system profile,
      perform two or more mapping performance tests, wherein:
         a first mapping performance test includes performing one or more transfers using a data copy mapping mode and collecting one or more associated performance statistics, and
         a second mapping performance test includes performing one or more transfers using a map/unmap mapping mode and collecting one or more associated performance statistics,
      determine a first mapping mode based on a comparison of a result of the mapping performance tests, and
      record the first mapping mode with a value of one or more parameters of the computer system profile.

8. The computer system of claim 7, wherein the notification of the modification of the computer system profile is a notification that a predetermined time interval has elapsed.

9. The computer system of claim 7, wherein the notification of the modification of the computer system profile is a notification of a modification of a value of a parameter of the computer system profile.

10. The computer system of claim 9, wherein the parameter of the computer system profile includes at least one of available hardware components, processor availability, I/O adapter availability, computer system power mode, I/O adapter interconnect bus standard, hardware revision level, firmware revision level, and DMA mapping history.

11. The computer system of claim 7, wherein the DMA controller is configured to:
   receive a request for a DMA data transfer within the computer system;
   determine, in response to receiving the request for the DMA data transfer, a second mapping mode based on available system profile data; and
   map one memory using the second mapping mode.

12. The computer system of claim 11, wherein the one memory is a main memory directly coupled with a processor via a memory bus.

13. The computer system of claim 11, wherein the DMA controller is configured to determine the second mapping mode based at least in part on the size of the DMA data transfer.

14. The computer system of claim 11, wherein the DMA controller is configured to determine the second mapping mode by selecting a predetermined mapping mode based on historical system profile data.

15. The computer system of claim 11, wherein the DMA controller is configured to determine the second mapping mode by selecting a predetermined mapping mode based on recorded system profile data.

* * * * *